Feb. 17, 1959 H. SINCLAIR 2,873,831
POWER TRANSMISSION SYSTEMS EMBODYING
HYDRAULIC TURBO-TRANSMITTERS
Filed Feb. 3, 1953 3 Sheets-Sheet 1

INVENTOR
Harold Sinclair
BY
Dean Fairbank & Hirsch
ATTORNEYS

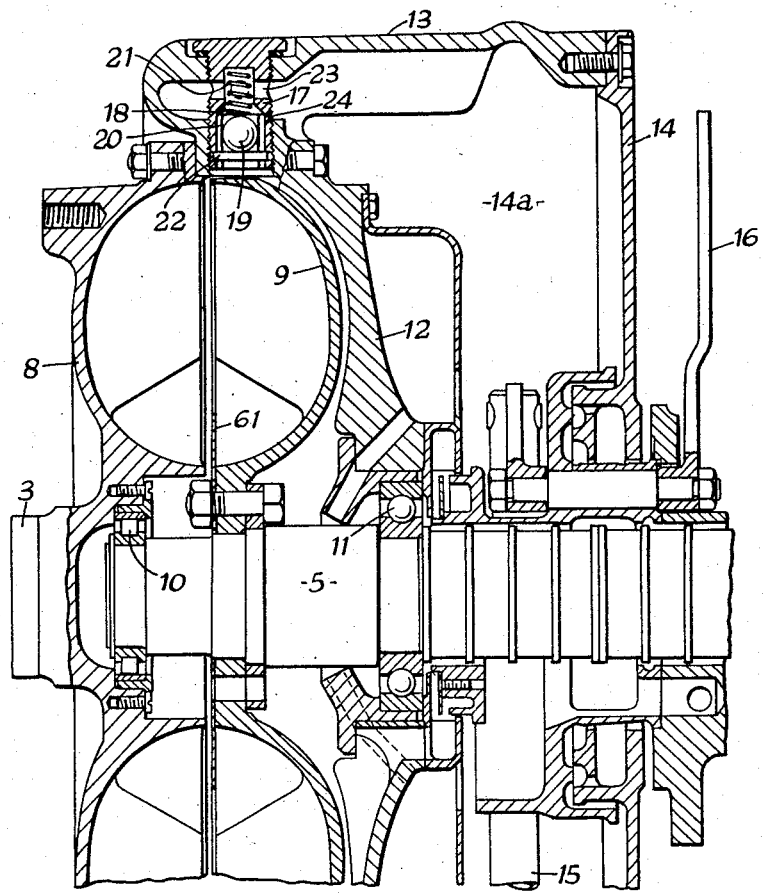

INVENTOR
Harold Sinclair
BY
ATTORNEYS

United States Patent Office 2,873,831
Patented Feb. 17, 1959

2,873,831

POWER TRANSMISSION SYSTEMS EMBODYING HYDRAULIC TURBO-TRANSMITTERS

Harold Sinclair, Windsor, England

Application February 3, 1953, Serial No. 334,804

Claims priority, application Great Britain
February 4, 1952

6 Claims. (Cl. 192—.02)

This invention relates to power-transmission systems of the type including an alternating current induction motor, a driven machine, and a hydraulic turbo-transmitter connected between the motor and the driven machine so as to enable them to operate at a variable velocity ratio, the hydraulic turbo-transmitter being of the type having means adapted to operate continuously while the driving part of the transmitter is rotating to admit working liquid to and exhaust working liquid from the working chamber of the transmitter, and one or more centrifugally controlled valves communicating with the working chamber for varying the rate of admitting or exhausting the working liquid automatically in response to a change in speed of the driving part.

Figure 1:
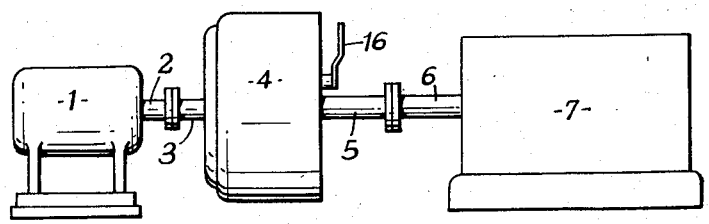

Power-transmission systems incorporating hydraulic turbo-transmitters of the kind referred to have been used in locomotives having an internal-combustion engine, the turbo-transmitter being a scoop-controlled turbo-coupling (as described in British Patent Specification No. 493,703 with reference to Figures 1 and 2 thereof) connecting the motor to a mechanical change-speed gear which in turn is connected to the driving axles. In these known systems the centrifugal valves vary the rate of exhausting the working liquid; they have a large flow capacity and serve, when the locomotive driver reduces the engine speed to idling, to reduce the quantity of liquid in the working chamber of the coupling rapidly, even though the scoop is left in operation, so as to reduce the idling drag torque transmitted by the coupling to a value so low that jaw-clutches can be operated in the change-speed gearing to select forward and reverse drives.

An object of this invention is to extend the field of usefulness of centrifugally-controlled valves in hydraulic turbo-transmitters, to systems wherein A. C. induction motors are used and operate within the small range of speeds, near to the synchronous speed, that comes between the no-load torque and the "pull-out" torque of the motor.

According to this invention, in a power-transmission system of the kind hereinbefore specified, the arrangement is such that the centrifugally-controlled valve or valves will operate while the system is under load, and in consequence of a slight change in the speed of the driving part of the turbo-transmitter resulting from an increase of load in the system in such a manner as will reduce the quantity of fluid in the working chamber of the coupling, which chamber will however remain full enough to maintain load on the motor while the system is subjected to increased load. In a preferred arrangement the centrifugally controlled valves vary the rate of exhausting of the working liquid from the working chamber.

The turbo-transmitter may be a turbo-coupling of the scoop-control type having the usual steep torque/slip characteristic of that type. In some circumstances it may be convenient to use a turbo-transmitter of the type having a reaction member held by a unidirectional clutch so that the transmitter will operate at low slip values as a coupling (i. e. having a 1-to-1 torque ratio) and at high slip values as a torque-converter.

Where two or more centrifugally-controlled valves are provided, they may be arranged to operate in succession as the speed of the driving part of the turbo-transmitter varies from one speed to another, in consequence of the variation in load within the aforementioned small range of speeds.

Additional means may be provided whereby the occurrence of an overload automatically effects a change in the speed of the driving part over and above that produced by the overload itself, sufficient to ensure more rapid and certain operation of the valves. For example the A. C. electric motor may be provided with means adapted to operate automatically to alter the torque/speed characteristic of the motor within the range of speeds at which the valves are required to operate in response to changes in motor speed, whereby the motor speed is further changed. The desired alteration in the torque-speed characteristic of the motor may be effected by an overload relay adapted upon overload to insert a low value of resistance into a circuit of the motor so as further to reduce slightly the motor speed.

An advantage of the invention is that it obviates the motor being tripped off the line by the overload trip device, then having to be restarted with resultant delay. A series of such restarts imposed on an A. C. motor already hot as a result of full-load operation is undesirable because of the high starting current and additional heating of the motor windings and also the additional heating of the starting switch and auto-transformer, if used. It is a great practical advantage to be able to keep the motor running, and to have the turbo-coupling serve to limit the increase in load, while the operator can deal with a severe slowing down or stalling condition by withdrawing the scoop and re-engaging it to assist other possible measures for overcoming the stoppage or unloading the driven machine.

In one form of the invention, the centrifugally-controlled valve or valves are arranged to open automatically in response to the decrease in speed of the driving part of the turbo-transmitter due to an increase in the torque load imposed on the system by the driven machine. In this case the flow-capacity of the centrifugally-controlled valves is such that when they are open, and so long as the increased load condition in the driven machine is not relieved, sufficient liquid is retained in the working chamber of the turbo-transmitter, through which the working fluid is being circulated, to prevent the motor speed from rising to the value at which the valves will reclose.

In order that the invention may be clearly understood and readily carried into effect, it will now be described in more detail with reference to the accompanying drawings, in which:

Fig. 1 is a diagrammatic view of a power transmission system in which the centrifugally-controlled valves regulate the discharge of liquid from the working chamber of a turbo-coupling of the scoop control type driven by a squirrel-cage electric motor.

Figure 5:
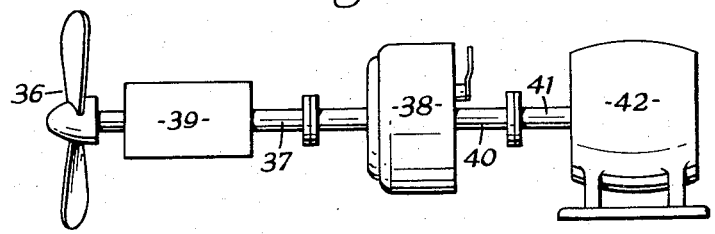
Figure 3:
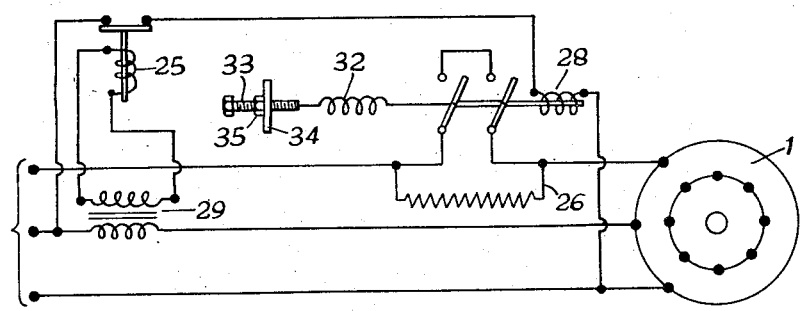
Figure 4:
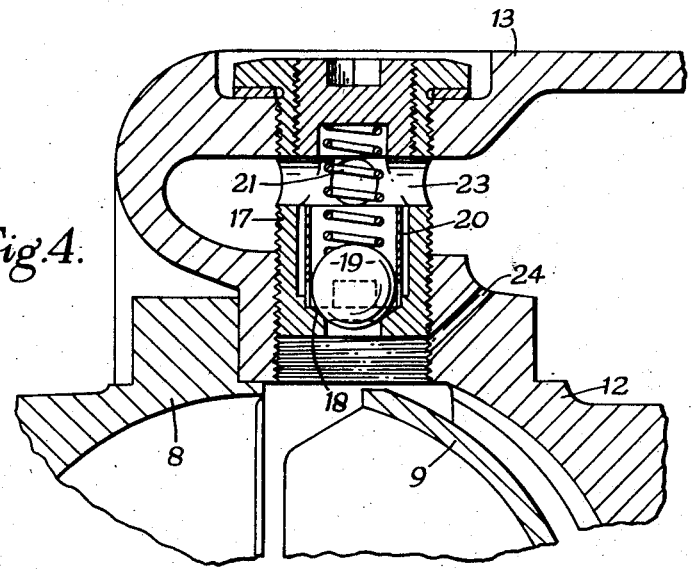

Fig. 2 is a sectional view on a larger scale of part of the turbo-coupling employed in the system of Fig. 1, showing one of the ball-valves of the coupling, Fig. 3 is a circuit diagram illustrating a suitable form of control circuit for the motor of Fig. 1, Fig. 4 is a view, similar to Fig. 2, of the coupling of Fig. 5, showing the ball valve reversed in its action as compared with the valve shown in Fig. 1.

Figure 6:
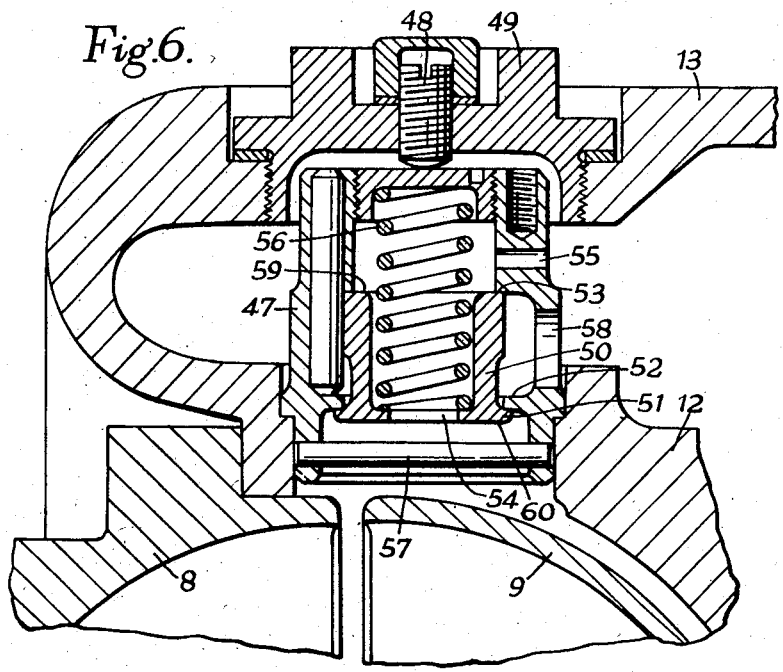

Fig. 5 is a diagrammatic view of a system according to the invention in which a wind motor drives an electric generator through the intermediary of a hydraulic turbocoupling, and Fig. 6 is a view similar to Fig. 2, but illustrating the use of centrifugally-controlled double-beat poppet valves instead of the ball valves of Fig. 2.

Referring to Figs. 1 and 2, the power transmission system comprises a squirrel-cage electric motor 1, which may have for example a synchronous speed of 1000 R. P. M. and a full-load speed of 970 R. P. M. The motor shaft 2 is coupled to the input shaft 3 of a hydraulic turbo-coupling 4 of the scoop control type, that is to say a coupling of the type in which an adjustable scoop tube feeds working fluid from a reservoir which rotates with the impeller to the working chamber of the coupling, via a circuit which may include a cooler, the working chamber being provided with leak-off nozzles via which fluid passes from the working chamber to the reservoir. The output shaft 5 of the hydraulic coupling is coupled to the driving shaft 6 of a driven machine 7. The latter is assumed to be a machine which is subject to heavy overloads or even stalling, e. g., a mining conveyor, cane-crushing rolls, a bucket dredger tumbler, oil drilling draw works or slush pumps. The coupling 4 comprises (see Fig. 2) an impeller 8 mounted on the input shaft 3, and a runner 9 mounted on the output shaft 5, which is journalled at 10 and 11 respectively within the impeller 8 and a casing 12 which rotates with the impeller and encloses the back of the runner 9. The casing 12 is formed with a cylindrical portion 13 to which is bolted an end plate 14 so as to form a reservoir chamber 14a. A slidable scoop tube 15, projecting into the reservoir chamber, is adjustable by means of a control lever 16. The scoop tube 15 serves to transfer fluid from the reservoir to the working chamber of the coupling by ports and passages which are not shown but which may be arranged as described in British Patent Specification Nos. 538,217, 517,989 or 493,703, the degree of filling of the working chamber depending on the adjustment of the scoop tube, as described in the above-mentioned specifications. The casing 12 is formed with say three screw threaded holes, spaced uniformly around the casing, into each of which is screwed a hollow plug 17 which is formed with an annular seat 18 for a ball valve 19 which is disposed within a perforated cylindrical guide 20 and is urged away from the seat 18 by a spring 21. A stop pin 22 determines the innermost position (with respect to the coupling axis) of the ball 19. The outer part of plug 17 is screwed into a screw-threaded hole in the cylindrical part 13 of the reservoir casing. A transverse relatively wide hole 23 extends from one side to the other of the plug on the side of valve seat 18 remote from ball 19, and a relatively narrow duct 24 is formed between the hole 23 and the space within the plug, at a point such that duct 24 is at all times freely open, even when the ball valve 19 is on its seat 18. Thus, when the ball valves are open fluid can flow freely from the working chamber to the reservoir via the wide holes 23 as well as via the ducts 24, and when the valves are closed fluid can flow from the working chamber to the reservoir at a restricted rate via the ducts 24.

A drop in impeller speed due to an overload on the system causes the valves 19 to open and cause the working chamber of the coupling partially to empty, it being noted that the scoop tube remains in the inserted position. The increased flow of fluid from the working chamber through the open valves will cause the ring of oil in the reservoir 14a to increase in thickness, since the flow area through the scoop tube 15 and the filling ducts back to the working chamber will be insufficient to feed fluid to the working circuit at the same rate at which fluid flows out of the working circuit. Eventually a balanced condition will be reached in which the scoop is ploughing deeply enough to return sufficient fluid to the working chamber to maintain load on the motor while the system is subject to overload. In consequence, the coupling 4 will be able to stall under overload while the motor 1 continues to run under load.

The ball valves 19 may be arranged to operate in succession, when the working chamber is full, at speeds representing permissible overloads of the motor. For example, where a motor speed of 960 R. P. M. corresponds to an overload of 33% and sustained stalling is unlikely, the valves may have equal flow capacities and may be arranged to open respectively at 970, 960 and 950 R. P. M. Alternatively, where provision is to be made for sustained stalling, the valves may all be arranged to open at about 970 R. P. M. corresponding to full load on the motor.

The flow capacities of the valves 19 are such as to maintain in the working chamber, when the scoop tube is inserted to the desired extent, any value of stalled torque between say 75% and 150% of full-load torque. If the stalled torque as determined by the partially filled condition of the working circuit is too low, hunting may occur owing to the motor being relieved of load sufficiently to enable it to speed up to the point where one or more of the centrifugal valves close and the working chamber fills again to increase the load on the motor.

Both in the stalled condition, or in the overloaded condition when the slip of the coupling is high but the motor is not stalled, one or more of the valves 19 will be open and the circulation of fluid through the cooler, where such is provided, will be greatly increased as is desirable in order to deal with the great increase in slip and consequently in the heating of the working fluid.

The characteristic of each centrifugal valve 19 may be such that the speed at which it opens is lower than the speed at which it closes again, the difference in the opening and closing speeds being due primarily to the effect of the pressure of the working fluid on the centrifugal valve after it has closed and being determined inter alia by the size and weight of the ball 19 and the rate of the spring 21. This characteristic is useful since after an overload has pulled the speed of motor 1 down to say 960 R. P. M. the valves 19 remain open until the load on the motor has been further reduced to the point at which the motor speed rises to the value at which the valves 19 close. The rise in the motor speed will result either from the partial or complete withdrawal of the scoop tube 15 by the operator, or from the removal of the overload condition in the driven machine 7.

Referring now to Fig. 3, the motor 1 is shown diagrammatically as a three-phase squirrel cage electric motor. The circuit shown includes an electric overload relay 25 (which may be replaced by a mechanical speed-responsive arrangement) which is adapted to insert resistance into the stator circuit of the motor when the motor load has risen to the value at which the centrifugal valves 19 are required to open. One phase of the stator circuit of the motor includes a resistance 26, which is short-circuited when the contacts of a contactor relay 28 are closed. The overload relay 25 is energised via a transformer 29 in a suitable phase of the stator circuit. The contacts of the overload relay 25 are normally open, and the contacts of the contactor relay are normally closed. The coil of relay 28 is arranged in series with the contacts of relay 25 so that upon the occurrence of an overload, which causes relay 25 to close its contacts, as shown, relay 28 is energised, thereby opening its contacts, as shown, so that the resistance 26 is effectively inserted into the stator circuit. When the overload is removed relay 25 opens its contacts, thereby de-energising the coil of relay 28, so that the contacts of relay 28 close under the action of a spring 32 and resistance 26 is short-circuited. To enable the spring 32 to be adjusted it is connected to an adjustable spindle 33 which is screwed into a fixed bracket 34 and is provided with a locknut 35. The resistance 26 may if desired be replaced by a reactance, and the said resistance or reactance may be included in two or three phases of the circuit. Where a mechanical speed-responsive device is employed instead of the relay 25 the said device may be arranged to respond to the difference in the speeds of two elements of the transmission system.

The effect of inserting resistance or reactance into the stator circuit of motor 1 is to make the torque-speed characteristic of the motor less steep, so that for a given motor torque the motor speed is lower than is the case when the resistance or reactance is withdrawn.

Assuming now, for example, that the coupling encounters an overload which reduces the motor speed to 960 R. P. M., this being the speed at which, it is assumed, the centrifugal valves 19 (or one of them) are required to open, the relay 25 operates to insert the resistance 26 into the stator circuit, so that the motor 1 then operates on another torque-speed characteristic with the result that the motor speed drops further. This further drop in motor speed, below that occasioned by the overload, for example to 900 R. P. M., results in a decrease in speed of the impeller of the coupling sufficient to ensure that the valves 19, or the appropriate one of them, will open due to this overload. This arrangement enables the precision of setting of the valves 19 to be less critical.

When upon removal of the overload on the coupling and in consequence the speed of motor 1 rises slightly beyond 960 R. P. M., or when such a rise of speed occurs due to the operator moving control lever 16 to withdraw the scoop tube 15 partially or completely, the resistance 26 is short-circuited and effectively withdrawn from the stator circuit, thereby restoring to the motor its normal torque-speed characteristic so that the motor speed increases still further and ensures closing of the valves 19.

In a modified arrangement (not illustrated) the resistance or reactance which is inserted into the stator circuit upon overload is only inserted temporarily, instead of throughout the existence of the overload, since it is only necessary for the motor speed to be reduced for a few seconds in order to ensure opening of the valves 19. Consequently, the resistance or reactance can be cut out again after a few seconds, whereupon the motor speed will rise again to the normal speed for the overloaded condition but the valves 19 will remain open. A further increase in motor speed will be required in order to cause the valves to close again, and to obtain this further increase the load must be greatly reduced, for example by the operator withdrawing the scoop to a suitable extent or unloading the driven machine. Hence the thermal rating of the resistance or reactance can be of short time rating.

Similar arrangements may be employed where the prime mover is a slip-ring motor, means being provided for inserting resistance or reactance into either the stator circuit or the rotor circuit of the motor, either during the whole period of overload or momentarily long enough to reduce the motor speed sufficiently to cause the centrifugal valves to open.

It may be desirable to provide the turbo-coupling with means for adjusting the rate of feed of working fluid from the scoop tube back to the working chamber. Such means may conveniently take the form of an adjustable valve located in an external circuit for example in one or other of the pipes leading to and from the cooler (where one is provided) the valve being adapted to restrict partially the flow of fluid. Such an arrangement permits an adjustment to be readily made in the characteristic of the turbo-coupling, in terms of the stalled torque when the motor speed is reduced by overload and the centrifugal valves are open.

In another form of the invention the centrifugal valves are arranged to open automatically in response to an increase in speed of the impeller beyond a predetermined speed. Such an arrangement is shown in Fig. 4 in which the same reference numerals are employed as in Fig. 2 for corresponding parts. It will be seen that in Fig. 4 the ball valve 19 tends to be pressed against its seat 18 by the spring 21 and to lift when the centrifugal force on the ball is sufficient to overcome the action of the spring, that is to say when the impeller speed is sufficiently high. The leak-off ducts 24, which are in this case formed in the casing 12, permit a restricted flow of fluid out of the working chamber when the valves are closed.

The invention in this latter form may be applied for example to a system wherein a wind motor drives an electric generator, e. g., a synchronous or an induction alternator, with the object of limiting the torque to a value below the pull-out torque when the wind speed is high. A system of this kind is illustrated in Fig. 5. The wind motor 36 is assumed to be provided with automatic pitch-varying mechanism and to be designed to generate full power at a wind speed ranging from 25 to 60 M. P. H. The wind motor 36 is connected to the impeller shaft 37 of the scoop control coupling 38 through mechanical speed-increasing gearing 39, and the runner shaft 40 of the coupling is connected to the driving shaft 41 of an alternator 42, which in the example may be assumed to be of the induction type and to have a synchronous speed of 1000 R. P. M., a full-load speed of 1030 R. P. M., and a maximum desirable overload speed of 1050 R. P. M. The ratio of the mechanical gearing 39 is such as to cause the alternator 42 to run at its full-load speed with a normal slip of say 2½ percent in the turbo coupling. When a gust raises the alternator speed to 1050 R. P. M., which is equivalent to say 1100 R. P. M. of the coupling impeller, the valves 19 open so as to empty the working chamber partially and increase the slip in the coupling and thereby prevent further rise in the alternator speed and allow time for the pitch-varying mechanism to feather the blades of the wind motor 36 should the gust be sustained. When the wind speed thereafter falls, the centrifugal valves 19 (Fig. 4) close and cause a return to the normal slip characteristic of the turbo coupling.

Another application of the form of the invention illustrated in Fig. 4 is to a system in which a source of mechanical power drives a machine, for example a supercharger or a generator, via the turbo coupling. When the speed of the said driving source rises beyond a predetermined value, the centrifugal valves 19 (Fig. 4) open so that the slip in the turbo coupling is increased, and a further increase in the speed of the driving source does not produce a further substantial increase in the speed of the driven machine.

Where the centrifugal valves are of the unbalanced type, e. g., spring-loaded ball valves as above-described, or spring-loaded poppet valves, the desired characteristics such as flow area and the angular speeds at which the valves open and close can be obtained within certain limits by suitably selecting the port area, the weight of the ball or other movable valve member, and the rate and initial loading of the spring. As an alternative to the unbalanced type of valve, and in order to reduce the difference between the angular speeds at which the valves open and close, there may be adopted a double-beat poppet valve or a piston-type valve fully or partially balanced for hydraulic pressure. Fig. 6 shows a double-beat poppet valve in the closed position. It comprises a hollow cylindrical valve body 47 held in position on the casing 12 by means of a stud 48 screwed into a cover 49 which is screwed into the cylindrical part 13 of the casing. The movable valve member 50 is of generally cylindrical form, its external surface being recessed to form a radial flange 51. In the closed position of the valve as shown, the flange 51 seats against an annular valve seat 52 formed on the interior of the valve body 47, and the upper edge of the valve member 50 seats against a second annular valve seat 53. With the valve member in this position fluid can flow from the working chamber of the coupling through a portion 54 in the inner end of the valve member 50, through the interior of the member 50 and through a port 55 in the valve member to the reservoir, port 55 corresponding to one of the leak-off nozzles normally provided in a scoop control coupling and permitting only a restricted flow of fluid. A spring 56 tends to move the valve member to its radially innermost position, which is determined by a stop pin 57. In this inner position of the valve member fluid can flow not only through the restricted port 55 but also through a port 58, of relatively large area, between the valve seats 52 and 53, the fluid flowing through the port 54 and around the outer end of the valve member to port 58, and also directly to port 58 around the flange 51.

The outer end of valve member 50 (the upper end in the figure) is of smaller internal diameter than the valve seat 52 so that when the valve is closed an annular surface 59 of the outer end of the valve member is exposed to the pressure of the fluid flowing to the restricted port 55, this pressure being opposed to the pressure of the fluid on the part of the annular surface 60, at the inner end of the valve member, which overlaps the seats 51 and 53. By suitably selecting the rate and initial loading of the spring 56 and the areas of the annular surfaces 59 and 60, the valve member can be nearly balanced when closed so as to reduce the difference between the angular impeller speeds at which the valve opens and closes.

A further form of valve which may be employed is a piston-type valve, which may have a loose fit in a valve cylinder such that when the valve is closed a leakage area remains which is sufficient to permit the restricted discharge of liquid from the working chamber when the valve is closed. This obviates the provision of leak-off nozzles or ports and reduces the risk of the valves sticking due to any foreign matter present.

The turbo-coupling preferably has its working circuit provided with a torque-limiting baffle (shown at 61 in Fig. 2) which operates in known manner to reduce the stalled torque of the coupling and thus assists the torque-limiting action of the centrifugal valves.

The turbo-coupling may be modified by replacing the centrifugal valves, the closure members of which are directly responsive to change in speed, as above-described, by hydraulically-operated valves of the disk or diaphragm type such as are used for securing rapid emptying of the working chamber of a turbo-coupling, but of a smaller flow-capacity. Such a hydraulically-operated valve is described, for example, in U. K. Patent Specification No. 493,703, with reference to Figures 4 and 5 thereof. In such a modified arrangement the hydraulically-operated valves are centrifugally controlled by means of auxiliary centrifugally-operated valves which supplement or take the place of the small leak-off nozzles (such as 119 in the said Figure 4) which control the hydraulic pressure on the backs of the disks of the hydraulically-operated valves. When the impeller speed attains the critical value at which the working chamber is required partially to empty, the auxiliary centrifugal valves open and relieve the fluid pressure on the hydraulically operated valve disks, which open under the pressure of the liquid in the working chamber and reduce the liquid content of this chamber rapidly. Such an arrangement is particularly useful with tumbler drives of bucket dredgers, wherein rapid emptying by withdrawal of the control scoop is a desirable working feature.

This example is also applicable to the case in which an induction motor employed as prime mover has some resistance permanently in the rotor winding in order to obtain a more drooping torque/speed characteristic.

I claim:
1. A power transmission system including an alternating current induction motor, a driven machine, a hydraulic turbo-transmitter connecting said motor with said driven machine, said turbo-transmitter comprising a working chamber, a driving part in said chamber rotated by said motor, means for continuously admitting working liquid to and exhausting working liquid from said working chamber while said driving part is rotated by said motor, and at least one centrifugally controlled valve communicating with said working chamber for controlling the amount of working liquid in said chamber, said valve being adapted to be opened to reduce the quantity of working liquid in said working chamber when a change in the speed of said driving part takes place resulting from an increase in load on said driven machine above a predetermined level, the flow capacity of said valve being such that sufficient liquid is retained in said working chamber to maintain load on said motor when said valve is open.

2. A power transmission system according to claim 1 wherein the said valve is a ball valve.

3. A power transmission system according to claim 1, wherein the valve is a double-beat poppet type valve which when closed is at least partially balanced for hydraulic pressure.

4. A power transmission system according to claim 1, including means operative in response to an overload to alter the torque/speed characteristic of said motor whereby to change the speed of the driving part of said turbo-transmitter to a value which ensures rapid operation of said valve to reduce the filling of said working chamber.

5. A power transmission system according to claim 1, including means operative in response to an overload to insert resistance into a circuit of said motor to reduce the motor speed whereby to reduce the speed of the driving part of said transmitter to a value which ensures rapid operation of said valve to reduce the filling of said working chamber.

6. A power transmission system comprising a turbo-transmitter having a driving part, a driven part, a working chamber in which said driving part and driven part are positioned, at least one centrifugally controlled valve in said working chamber for controlling the amount of working liquid therein, means for rotating said driving part, said valve being arranged to open automatically in response to a decrease in speed of said driving part due to an increase in the torque load imposed on said driven part, the flow capacity of said valve being such that so long as the increased load condition is not relieved sufficient working fluid is retained in said working chamber to prevent the speed of said driving part from rising to the value at which said valve will reclose, and means for automatically reducing the speed of said means for rotating said driving part to a value such as to ensure rapid operation of said valve upon the occurrence of an overload on said driven part.

References Cited in the file of this patent
UNITED STATES PATENTS

| | | |
|---|---|---|
| 1,639,255 | Brackett | Aug. 16, 1927 |
| 1,873,688 | Walker | Aug. 23, 1932 |
| 2,141,940 | Sinclair | Dec. 27, 1938 |
| 2,246,018 | Snyder | June 17, 1941 |
| 2,298,105 | Canaan | Oct. 6, 1942 |
| 2,428,723 | Reeves | Oct. 7, 1947 |